US012649152B2

(12) United States Patent　　　　(10) Patent No.:　US 12,649,152 B2

Hsieh　　　　　　　　　　　　　　　　　　(45) Date of Patent:　　　　Jun. 9, 2026

---

(54) BIOSENSOR AND CELL MANIPULATION METHOD

(71) Applicant: VisEra Technologies Company Limited, Hsin-Chu City (TW)

(72) Inventor: Hsin-Yi Hsieh, Hsin-Chu City (TW)

(73) Assignee: VisEra Technologies Company Limited, Hsin-Chu City (TW)

( * ) Notice: Subject to any disclaimer, the term of this patent is extended or adjusted under 35 U.S.C. 154(b) by 796 days.

(21) Appl. No.: 17/992,126

(22) Filed: Nov. 22, 2022

(65) Prior Publication Data

US 2024/0165611 A1　　May 23, 2024

(51) Int. Cl.
　　*B01L 3/00*　　　　(2006.01)
　　*G01N 21/39*　　　(2006.01)
　　*G01N 21/41*　　　(2006.01)
　　*G01N 21/64*　　　(2006.01)
　　*G01N 21/77*　　　(2006.01)
(52) U.S. Cl.
　　CPC ........ *B01L 3/502715* (2013.01); *G01N 21/39* (2013.01); *G01N 21/41* (2013.01); *G01N 21/6428* (2013.01); *B01L 2300/0645* (2013.01); *B01L 2400/0427* (2013.01); *G01N 2021/7786* (2013.01)
(58) Field of Classification Search
　　CPC ........ B01L 2200/0652; B01L 2200/12; B01L 2300/0645; B01L 2400/0427; B01L 3/502715; B01L 3/502761; B01L 3/502792; G01N 15/1456; G01N 15/1484; G01N 2015/1006; G01N 2021/7786; G01N 21/39; G01N 21/41; G01N 21/6428; G01N 21/6454
See application file for complete search history.

(56) References Cited

U.S. PATENT DOCUMENTS

2017/0173580 A1*　6/2017　Lowe, Jr. ............ B01L 3/50273
2017/0306383 A1*　10/2017　Imai ..................... G01N 27/327
2022/0113469 A1*　4/2022　Rothberg ................ G02B 5/20

\* cited by examiner

*Primary Examiner* — Jennifer Wecker
*Assistant Examiner* — Jonathan Bortoli
(74) *Attorney, Agent, or Firm* — MUNCY, GEISSLER, OLDS & LOWE, P.C.

(57)　　　　ABSTRACT

A biosensor is provided. The biosensor includes a plurality of sensor units. Each of the sensor units includes a plurality of photodiodes, a plurality of first electrodes, an electro-wetting chamber, a second electrode, a bottom conductive layer, a photoconductive layer, an open cell chamber, and a top conductive layer. The first electrodes are disposed above the photodiodes. The electro-wetting chamber is disposed above the first electrodes, and a non-polar liquid is disposed in the electro-wetting chamber. The second electrode is disposed on the electro-wetting chamber. The bottom conductive layer is disposed above the second electrode. The photoconductive layer is disposed on the bottom conductive layer. The open cell chamber is disposed on the photoconductive layer and configured to receive a cell. The top conductive layer is disposed on the open cell chamber.

20 Claims, 12 Drawing Sheets

<u>10</u>

BIOSENSOR AND CELL MANIPULATION METHOD

BACKGROUND

Technical Field

The present disclosure relates to a biosensor and a cell manipulation method, and in particular, it relates to a biosensor having electro-wetting chambers.

Description of the Related Art

Recently, integrated sensing devices have been used for biological analysis. For this application, a biometric object or bio-sample is placed on a biosensor, and the light that reflect off (or is emitted by) the biometric object or bio-sample is directed to the photodiode of the biosensor. Therefore, the profile of the biometric object (or the biological properties of the bio-sample) may be identified for further analysis.

One of the leading-edge applications of biosensors is in optofluidic manipulation. Optofluidic manipulation is a new generation of technologies based on forces exerted by a light beam, enabling interactive biology at the cellular level and thus leading to a new fresh turning point in drug discovery, such as single cell incubation and screening for manufacturing monoclonal antibodies in immune cancer therapy.

Although existing biosensors have been adequate for their intended purposes, they have not been entirely satisfactory in all respects. Therefore, a novel biosensor is required for cell incubation and manipulation in a much more convenient manner. In addition, it is also desirable to produce a biosensor that can precisely identify various biological features and bio-reactions.

BRIEF SUMMARY OF THE DISCLOSURE

In accordance with some embodiments of the disclosure, a biosensor is provided. The biosensor includes a plurality of sensor units. Each sensor units includes a plurality of photodiodes, a plurality of first electrodes, an electro-wetting chamber, a second electrode disposed, a bottom conductive layer, a photoconductive layer, an open cell chamber, and a top conductive layer. The first electrodes are disposed above the photodiodes. The electro-wetting chamber is disposed above the first electrodes. A non-polar liquid is disposed in the electro-wetting chamber. The second electrode is disposed on the electro-wetting chamber. The bottom conductive layer is disposed above the second electrode. The photoconductive layer is disposed on the bottom conductive layer. The open cell chamber is disposed on the photoconductive layer and configured to receive a cell. The top conductive layer is disposed on the open cell chamber.

In accordance with some embodiments of the disclosure, a cell manipulation method is provided. The cell manipulation method includes providing the aforementioned biosensor, introducing cells into the biosensor, applying a voltage to the bottom conductive layer and the top conductive layer, and applying a voltage to one or more of the first electrodes and the second electrode to form a first electric field in the electro-wetting chamber. The non-polar liquid is deformed by the first electric field. The first optical path is formed in the non-polar liquid. The cell manipulation method further includes forming a first optical pattern surrounding one of the cells using a first laser beam that passes through the first optical path, leaving the cell surrounded by the first optical pattern in the open cell chamber, and removing the remaining cells from the biosensor.

A detailed description is given in the following embodiments with reference to the accompanying drawings.

BRIEF DESCRIPTION OF THE DRAWINGS

The disclosure may be more fully understood by reading the subsequent detailed description and examples with references made to the accompanying drawings, wherein.

DETAILED DESCRIPTION OF THE DISCLOSURE

Figure 1A:
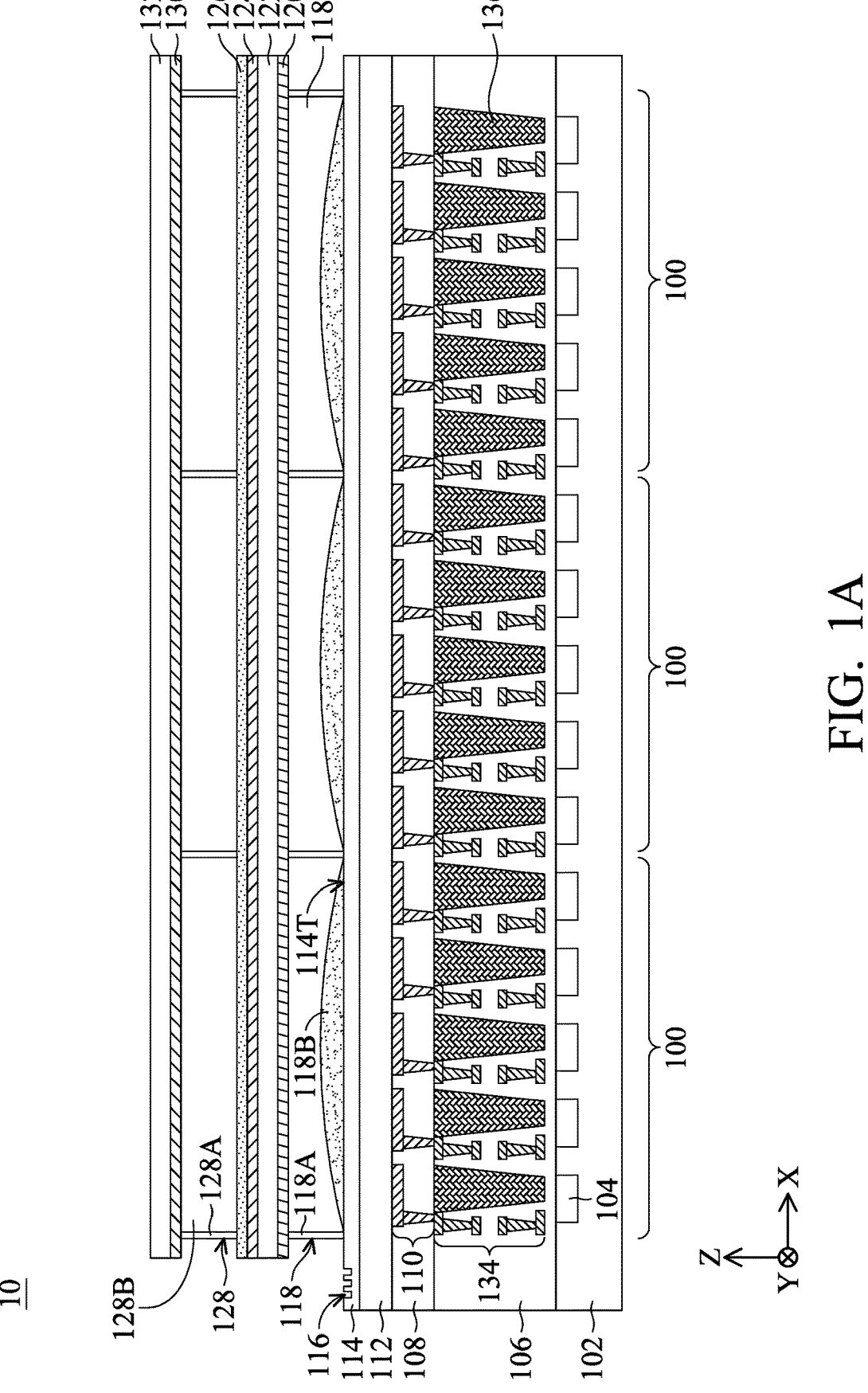
FIGS. 1A and 1B are a cross-section view and a top view of a biosensor in accordance with some embodiments.

The biosensor and the cell manipulation method of the present disclosure are described in detail in the following description. In the following detailed description, for purposes of explanation, numerous specific details and embodiments are set forth in order to provide a thorough understanding of the present disclosure. The specific elements and configurations described in the following detailed description are set forth in order to clearly describe the present disclosure. It will be apparent, however, that the exemplary embodiments set forth herein are used merely for the purpose of illustration, and the concept of the present disclosure may be embodied in various forms without being limited to those exemplary embodiments.

In addition, the drawings of different embodiments may use like and/or corresponding numerals to denote like and/or corresponding elements in order to clearly describe the present disclosure. However, the use of like and/or corresponding numerals in the drawings of different embodiments does not suggest any correlation between different embodiments. It should be understood that this description of the exemplary embodiments is intended to be read in connection with the accompanying drawings, which are to be considered part of the entire written description. The drawings are not drawn to scale. In addition, structures and devices are shown schematically in order to simplify the drawing.

In addition, the expressions "a layer is disposed above another layer" or "a layer is disposed on another layer" may indicate that the layer is in direct contact with the other layer, or that the layer is not in direct contact with the other layer, there being one or more intermediate layers disposed between the layer and the other layer.

It should be understood that, although the terms first, second, third etc. may be used herein to describe various elements, components, regions, layers, portions and/or sections, these elements, components, regions, layers, portions and/or sections should not be limited by these terms. These terms are only used to distinguish one element, component, region, layer, portion or section from another element, component, region, layer or section. Thus, a first element, component, region, layer, portion or section discussed below could be termed a second element, component, region, layer, portion or section without departing from the teachings of the present disclosure.

The term "about" typically mean +/−10% of the stated value, more typically mean +/−5% of the stated value, more typically +/−3% of the stated value, more typically +/−2% of the stated value, more typically +/−1% of the stated value and even more typically +/−0.5% of the stated value. The stated value of the present disclosure is an approximate value. When there is no specific description, the stated value includes the meaning of "about" or "substantially".

Unless defined otherwise, all technical and scientific terms used herein have the same meaning as commonly understood by one of ordinary skill in the art to which this disclosure belongs. It should be appreciated that, in each case, the term, which is defined in a commonly used dictionary, should be interpreted as having a meaning that conforms to the relative skills of the present disclosure and the background or the context of the present disclosure, and should not be interpreted in an idealized or overly formal manner unless so defined.

In accordance with some embodiments of the disclosure, each sensor unit of the biosensor includes an electro-wetting chamber sandwiched between the first electrodes and the second electrode and an open cell chamber above the electro-wetting chamber. A specific optical path may be formed in the non-polar liquid in the electro-wetting chamber by applying a voltage to some of the first electrodes and the second electrode, and thus an optical pattern may be generated surrounding the cell to be manipulated in the open cell chamber or outside the open cell chamber. The optical pattern in combination with an electric field generated between the top and bottom conductive layers on the opposite sides of the open cell chamber gives rise to an electrophoretic force so that a cell in the open cell chamber or outside the open cell chamber could be positioned at a predetermined location. As such, single cell manipulation may be realized using such an elaborate device, and this technology may enable a rapid and efficient drug discovery process.

Figure 1B:
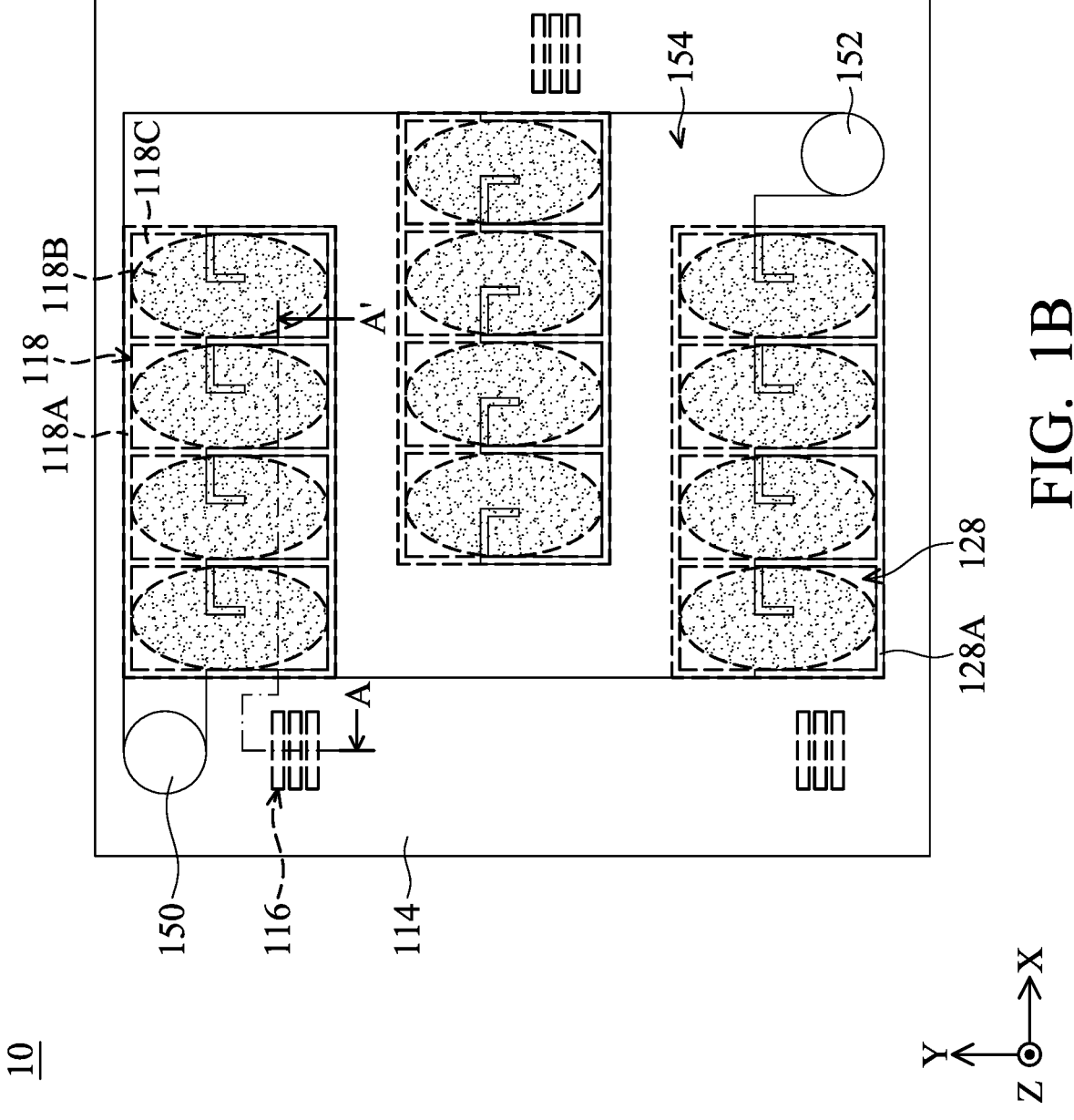

FIGS. 1A and 1B are a cross-section view and a top view of a biosensor 10 in accordance with some embodiments. It should be noted that the cross-sectional view of the biosensor 10 shown in FIG. 1A is taken along a line A-A' in FIG. 1B. In addition, for ease of illustration, some of the elements included in the biosensor 10 are omitted in FIG. 1B. Referring to FIG. 1A, the biosensor 10 includes a plurality of sensor units 100. Each sensor unit 100 includes a plurality of photodiodes 104. As shown in the cross-sectional view of FIG. 1A, although five photodiodes 104 are included in each sensor unit 100, the number of the photodiodes 104 in each sensor unit 100 is not limited thereto. In other embodiments, each sensor unit 100 may include more or fewer photodiodes 104, such as more than five photodiodes 104 or fewer than five photodiodes 104.

The photodiodes 104 are disposed in a substrate 102. In some embodiments, the substrate 102 may be a semiconductor substrate, for example, a silicon substrate. Furthermore, in some embodiments, the semiconductor substrate may also be an elemental semiconductor including germanium, a compound semiconductor including gallium nitride (GaN), silicon carbide (SiC), gallium arsenide (GaAs), gallium phosphide (GaP), indium phosphide (InP), indium arsenide (InAs), and/or indium antimonide (InSb), an alloy semiconductor including silicon germanium (SiGe) alloy, gallium arsenide phosphide (GaAsP) alloy, aluminum indium arsenide (AlInAs) alloy, aluminum gallium arsenide (AlGaAs) alloy, gallium indium arsenide (GaInAs) alloy, gallium indium phosphide (GaInP) alloy, and/or gallium indium arsenide phosphide (GaInAsP) alloy, or combinations thereof.

The photodiodes 104 may be configured to detect light emitted by an object or a sample. The photodiodes 104 may convert measured light into current signals, and may be connected to a source and a drain of a metal-oxide-semiconductor (MOS) transistor (not shown) that may transfer the current to another component, such as another MOS transistor. That other component may include, but is not limited to, a reset transistor, a current source follower, or a row selector for transforming the current into digital signals.

According to some embodiments, each sensor unit 100 further includes an interlayer 106. The interlayer 106 is disposed on the substrate 102 and the photodiodes 104. In one embodiment, the interlayer 106 is in direct contact with the photodiodes 104. In some embodiments, the interlayer 106 may include a dielectric material, such as silicon oxide, silicon nitride, silicon oxynitride, aluminum oxide, any other suitable dielectric material, or a combination thereof. In one embodiment, the interlayer 106 may be transparent. More specifically, the material of the interlayer 106 may have a light transmittance to light with a wavelength in a range from 200 nm to 1100 nm greater than 90%, or preferably greater than 95%. The interlayer 106 may be formed using suitable deposition techniques, such as a spin-on coating process, chemical vapor deposition (CVD), physical vapor deposition (PVD), atomic layer deposition (ALD), other suitable deposition methods, or a combination thereof.

Still referring to FIG. 1A, in some embodiments, each sensor unit 100 further includes a wiring layer 134 disposed in the interlayer 106. The wiring layer 134 may be metal wiring lines that interconnect the photodiodes 104 and the transistors (not shown) with the peripheral circuits and the outside of the device. In accordance with some embodiments, the material of the wiring layer 134 may include silver (Ag), aluminum (Al), gold (Au), copper (Cu), niobium (Nb), nickel (Ni), titanium (Ti), tungsten (W), silver alloy, aluminum alloy, gold alloy, copper alloy, niobium alloy, nickel alloy, titanium alloy, tungsten alloy, or a combination thereof.

In some embodiments, each sensor unit 100 may further include color filters 136 disposed in the interlayer 106. The color filters 136 may be alternately disposed between the metal wiring lines of the wiring layer 134. According to some embodiments, the color filters 136 are disposed above the photodiodes 104. More specifically, in some embodiments, each color filter 136 corresponds to one of the underlying photodiodes 104. Therefore, in the embodiments as shown in FIG. 1A, five color filters 136 correspond to five underlying photodiodes 104, and these color filters 136 are disposed above the photodiodes 104 in one-to-one correspondence.

In some embodiments, the color filters 136 may be organic color filters. The organic color filters are typically spin-on photoactive organic films with pigment additives to result in absorption of desired light frequencies (e.g., blue, green, or red). Accordingly, in some embodiments, the color filters 136 in the sensor unit 100 may have the same color or different colors from one another. For example, the color of the color filters 136 may be red, green, blue, or white. The color filters 136 with different colors may be formed in sequence by a coating, exposure, and development process at different steps. Alternatively, the color filters 136 may be formed by ink-jet printing. In some embodiments, the color filters 136 may include an absorption filter, an interference filter, a plasmonic metasurface structure, a dielectric metasurface structure, or a combination thereof.

Still referring to FIG. 1A, each sensor unit 100 may further include an electrode layer 108 on the interlayer 106. The electrode layer 108 includes a dielectric layer and a plurality of first electrodes 110 disposed in the dielectric layer. The dielectric layer of the electrode layer 108 may include a transparent dielectric material, such as silicon oxide, silicon nitride, silicon oxynitride, aluminum oxide, any other suitable dielectric material, or a combination thereof. More specifically, the material of the dielectric layer of the electrode layer 108 may have a light transmittance to light with a wavelength in a range from 200 nm to 1100 nm greater than 90%, or preferably greater than 95%.

According to some embodiments, the first electrodes 110 are disposed above the photodiodes 104 in one-to-one correspondence. In one embodiment, the first electrodes 110 are in physical contact with and electrically connect with the underlying wiring layer 134 so that a voltage could be applied to the first electrodes 110 through the wiring layer 134. In some embodiments, the material of the first electrodes 110 may include indium tin oxide (ITO), antimony-doped tin oxide (ATO), fluorine-doped tin oxide (FTO), zinc oxide (ZnO), aluminum-doped zinc oxide (AZO), indium-doped zinc oxide (IZO), gallium-doped zinc oxide (GZO), indium/gallium-doped zinc oxide (IGZO), or combinations thereof. In some embodiments, the first electrodes 110 may be transparent. More specifically, the material of the first electrodes 110 may have a light transmittance to light with a wavelength in a range from 200 nm to 1100 nm greater than 90%, or preferably greater than 95%.

According to some embodiments, the first electrodes 110 may be formed by depositing an electrode material layer followed by patterning the electrode material layer. This way, the first electrodes 110 may be formed as a patterned electrode array that generates a non-uniform electric field for electro-wetting applications. In particular, in some embodiments, as shown in FIG. 1A, the first electrodes 110 may be metal vias in combination with patterned metal layers. In addition, in some embodiments, the first electrodes 110 may not be in physical contact with the color filters 136 in the interlayer 106.

Referring again to FIG. 1A, each sensor unit 100 further includes a stack of dielectric layers 112. The stack of dielectric layers 112 is disposed on the electrode layer 108. Likewise, the stack of dielectric layers 112 is disposed above the first electrodes 110 in the electrode layer 108 as well. The stack of dielectric layers 112 may prevent light for fluorescence excitation and/or for cell manipulation from passing through and being absorbed by the photodiodes 104, thereby decreasing the signal-to-noise ratio of the biosensor 10. In one embodiment, the stack of dielectric layers 112 is in direct contact with the first electrodes 110.

According to some embodiments, the stack of dielectric layers 112 may include an interference filter. In particular, the interference filter of the stack of dielectric layers 112 may be formed of at least two different dielectric materials that are deposited alternately. One of the dielectric materials may be a dielectric material having a low refractive index, and another one may be a dielectric material having a high refractive index, which is greater than that of the former one. In one embodiment, the topmost layer in the stack of dielectric layers 112 may be the dielectric material with a low refractive index. In some embodiments, the dielectric material with a high refractive index, such as greater than about 1.7 in the visible-light wavelength, may include titanium oxide ($TiO_2$), silicon nitride ($Si_3N_4$), hafnium oxide ($HfO_2$), zirconium oxide ($ZrO_2$), aluminum oxide ($Al_2O_3$), niobium oxide ($Nb_2O_5$), polycrystalline silicon (polysilicon), amorphous silicon (a-Si), or a combination thereof. In some embodiments, the dielectric material with a low refractive index, such as less than about 1.7 in the visible-light wavelength, may include silicon oxide ($SiO_2$). In accordance with some embodiments, the overall thickness of the stack of dielectric layers 112 may be between about 0.1 μm and about 5.0 μm.

In some embodiments, each sensor unit 100 further includes a waveguide layer 114. The waveguide layer 114 is disposed on the stack of dielectric layers 112. According to some embodiments, the waveguide layer 114 is formed of a material with a high refractive index, such as higher than about 1.5. The material having a high refractive index of the waveguide layer 114 may enable light, generated from a light source (not shown), to propagate through the waveguide layer 114 until it encounters a medium with a refractive index between those of the water (n~1.33) and the waveguide layer 114. The light may pass through the medium with the lower refractive index, and part of light may thither propagate through the medium while the rest of light may still propagate in the waveguide layer 114. In some embodiments, the waveguide layer 114 may be a linear waveguide or a planar waveguide (as shown in FIG. 1B). According to some embodiments, the material of the waveguide layer 114 may include tantalum oxide ($Ta_2O_5$), silicon nitride ($Si_3N_4$), niobium oxide ($Nb_2O_5$), titanium oxide ($TiO_2$), aluminum oxide ($Al_2O_3$), or a combination thereof. In some embodiments, the material of the waveguide layer 114 may include polymer, such as polynorbornene, SUB, polydimethylsiloxane (PDMS), epoxy, or a combination thereof.

As shown in FIGS. 1A and 1B, in some embodiments, there is a grating structure 116 in the waveguide layer 114. In particular, the grating structure 116 is formed in the region of the waveguide layer 114 that no sensor unit 100 is disposed in. The grating structure 116 may facilitate an optical beam from a light source to enter the waveguide layer 114, namely to be coupled into the waveguide layer 114, and the optical beam may propagate through the waveguide layer 114 accordingly. According to some embodiments, the grating structure 116 may be formed by partially patterning the waveguide layer 114 using any suitable etching methods. In one embodiment, the grating structure 116 in the waveguide layer 114 does not expose the underlying stack of dielectric layers 112.

Furthermore, each sensor unit 100 further includes an electro-wetting chamber 118 and a second electrode 120. The electro-wetting chamber 118 is disposed on the waveguide layer 114, and the second electrode 120 is disposed on the electro-wetting chamber 118. In some embodiments, the top surface 114T of the waveguide layer 114 may be exposed in the electro-wetting chamber 118. Referring to FIGS. 1A and 1B, there is a non-polar liquid 118B disposed in each electro-wetting chamber 118 of the sensor unit 100. In one embodiment, the non-polar liquid 118B may be an oil droplet. When applying a voltage to one or more of the first electrodes 110 and the second electrode 120, the non-polar liquid 118B may be deformed because of the electric field caused by the voltage. Applying a voltage to either some of or all of the first electrodes 110 may cause the non-polar liquid 118B to bead in the electro-wetting chamber 118, and the non-polar liquid 118B may be in direct contact with both the waveguide layer 114 and the second electrode 120.

Accordingly, an optical path may be formed in the non-polar liquid 118B and between the waveguide layer 114 and the second electrode 120.

In some embodiments, the material of the second electrode 120 may include indium tin oxide (ITO), antimony-doped tin oxide (ATO), fluorine-doped tin oxide (FTO), zinc oxide (ZnO), aluminum-doped zinc oxide (AZO), indium-doped zinc oxide (IZO), gallium-doped zinc oxide (GZO), indium/gallium-doped zinc oxide (IGZO), or combinations thereof. According to some embodiments, the second electrode 120 may be transparent. More specifically, the material of the second electrode 120 may have a light transmittance to light with a wavelength in a range from 200 nm to 1100 nm greater than 90%, or preferably greater than 95%.

In some embodiments, the refractive index of the non-polar liquid 118B is lower than that of the waveguide layer 114. As explained above, when the light propagating through the waveguide layer 114 encounters the non polar liquid 118B, which has a lower refractive index, in the electro-wetting chamber 118, it may enter the optical path formed in the non-polar liquid 118B and may further propagate through the non-polar liquid 118B.

In some embodiments, the non-polar liquid 118B may be colored red, green, or blue to form a pixelated non-polar liquid 118B. The pixelated non-polar liquid 118B may function as controllable color filter to allow light with a specific color to pass through. This way, samples having different fluorescence molecules in a sensor unit 100 may be concomitantly excited even using the same light source, and various fluorescent signals with different emission spectrums may be identified by a set of photodiodes 104 with different colored non-polar liquid 118B in a sensor unit 100 for more sophisticated analysis.

As shown in FIGS. 1A and 1B, the electro-wetting chamber 118 includes an isolation structure 118A. The isolation structure 118A is disposed between the waveguide layer 114 and the second electrode 120 and surrounding the non-polar liquid 118B. The isolation structure 118A is configured to define the closed space of the electro-wetting chamber 118 and to provide structural support for the electro-wetting chamber 118. In accordance with some embodiments, the material of the isolation structure 118A may include silicon oxide (SiO₂), a polymer material, or a combination thereof. For example, the polymer material may include, but is not limited to, bisbenzocyclobutene (BCB), polyimide (PI), polymethylmethacrylate (PMMA), cycloolefin polymer (COP), polycarbonate (PC), another suitable material, or a combination thereof.

Moreover, in some embodiments, a polar liquid 118C is further disposed in the electro-wetting chamber 118. The polar liquid 118C fills the remaining space in the electro-wetting chamber 118 that is not occupied by the non-polar liquid 118B. In some embodiments, the refractive index of the polar liquid 118C is lower than that of the non-polar liquid 118B. Therefore, the light propagating through the waveguide layer 114 is prone to enter the non-polar liquid 118B rather than the polar liquid 118C. According to some embodiments, the polar liquid 118C may be water.

Referring again to FIG. 1A, in some embodiments, each sensor unit 100 further includes a supporting layer 122. The supporting layer 122 is disposed on the second electrode 120. The supporting layer 122 may include any suitable materials. In some embodiments, the supporting layer 122 may be a flexible material, such as polyethylene terephthalate (PET), polysulfone (PES), polyimide (PI), polycarbonate (PC), polymethylmethacrylate (PMMA), silicone, epoxy, or a combination thereof. In other embodiments, the supporting layer 122 may be a rigid material, such as a glass, sapphire, silicon oxide, or a combination thereof. In addition, according to some embodiments, the supporting layer 122 may be transparent. More specifically, the material of the supporting layer 122 may have a light transmittance to light with a wavelength in a range from 200 nm to 1100 nm greater than 90%, or preferably greater than 95%.

Still referring to FIG. 1A, each sensor unit 100 further includes a bottom conductive layer 124, a photoconductive layer 126, an open cell chamber 128, and a top conductive layer 130. The bottom conductive layer 124 is disposed on the supporting layer 122. The photoconductive layer 126 is disposed on the bottom conductive layer 124. The open cell chamber 128 is disposed on the photoconductive layer 126 and configured to receive a cell. The top conductive layer 130 is disposed on the open cell chamber 128.

In some embodiments, the materials of the bottom conductive layer 124 and the top conductive layer 130 may include indium tin oxide (ITO), antimony-doped tin oxide (ATO), fluorine-doped tin oxide (FTO), zinc oxide (ZnO), aluminum-doped zinc oxide (AZO), indium-doped zinc oxide (IZO), gallium-doped zinc oxide (GZO), indium/gallium-doped zinc oxide (IGZO), or combinations thereof. In addition, according to some embodiments, the bottom conductive layer 124 and/or the top conductive layer 130 may be transparent More specifically, the materials of the bottom conductive layer 124 and/or the top conductive layer 130 may have a light transmittance to light with a wavelength in a range from 200 nm to 1100 nm greater than 90%, or preferably greater than 95%.

In some embodiments, the photoconductive layer 126 may include amorphous silicon. In one embodiment, the photoconductive layer 126 may include amorphous hydrogenated silicon. The photoconductive layer 126 exhibits high resistance in the absence of light and high conductance under illumination. Therefore, to form a non-uniform electric field in the open cell chamber 128 and to realize cell manipulation, a portion of the photoconductive layer 126 may be converted from an insulated state into a conductive state by an optical pattern generated using the electro-wetting property of the electro-wetting chamber 118. In accordance with some embodiments, the thickness of the photoconductive layer 126 may be between about 0.1 μm and about 5.0 μm.

According to some embodiments, the photoconductive layer 126 may be a single-layered structure or a multi-layered structure. In the embodiments in which the photoconductive layer 126 is a multi-layered structure, the photoconductive layer 126 may be formed of an n-doped amorphous hydrogenated silicon and an un-doped amorphous hydrogenated silicon on the n-doped amorphous hydrogenated silicon. The multi-layered structure of the n-doped amorphous hydrogenated silicon and the un-doped amorphous hydrogenated silicon can increase the conductivity and be used when the fluid is a cell culture medium. The n-doped amorphous hydrogenated silicon of the photoconductive layer 126 may be doped with phosphorus, arsenic, antimony, or a combination thereof. In addition, the term "un-doped" used herein means that a minimum level or a baseline level of dopants are present in the material due to unavoidable introduction of some foreign material during the otherwise intrinsic deposition process. As a general matter, the un-doped amorphous hydrogenated silicon of the photoconductive layer 126 may have a dopant concentration under 5×10¹⁷ atoms/cm³. However, it is desirable to maintain the un-doped amorphous hydrogenated silicon in an un-doped state. In one embodiment, the "un-doped" amorphous hydrogenated silicon refers to the amorphous hydrogenated silicon that is not implanted with other elements, such as a III-V semiconductor, by diffusion and ion implantation.

As shown in FIGS. 1A and 1B, the open cell chamber 128 may include an isolation structure 128A for supporting the open cell chamber 128 and a receiving space 128B for receiving a cell. The material of the isolation structure 128A may be similar to or the same as that of the isolation structure 118A, which is not repeated herein.

In some embodiments, each sensor unit 100 may further include a cladding layer 132. The cladding layer 132 is disposed on the top conductive layer 130. The cladding layer 132 may include any suitable materials. In some embodiments, the cladding layer 132 may be a flexible material, such as polyethylene terephthalate (PET), polysulfone (PES), polyimide (PI), polycarbonate (PC), polymethylmethacrylate (PMMA), silicone, epoxy, or a combination thereof. In other embodiments, the cladding layer 132 may be a rigid material, such as a glass, sapphire, silicon oxide, or a combination thereof. In addition, according to some embodiments, the cladding layer 132 may be transparent. More specifically, the material of the cladding layer 132 may have a light transmittance to light with a wavelength in a range from 200 nm to 1100 nm greater than 90%, or preferably greater than 95%.

Referring to FIG. 1B, in some embodiments, the biosensor 10 further includes an inlet 150, an outlet 152, and microfluidic channel 154. The microfluidic channel 154 connects the inlet 150 as an entrance for cells, buffers, reagents, and culture media from an external reservoir (not shown) with the outlet 152 for waste disposal. Furthermore, in some embodiments, the microfluidic channel 154 may connect with the open cell chamber 128 to provide cells, buffers, reagents, and culture media. The microfluidic channel 154 may be a single flow channel providing a flow path for introducing cells or solutions.

Figure 2:
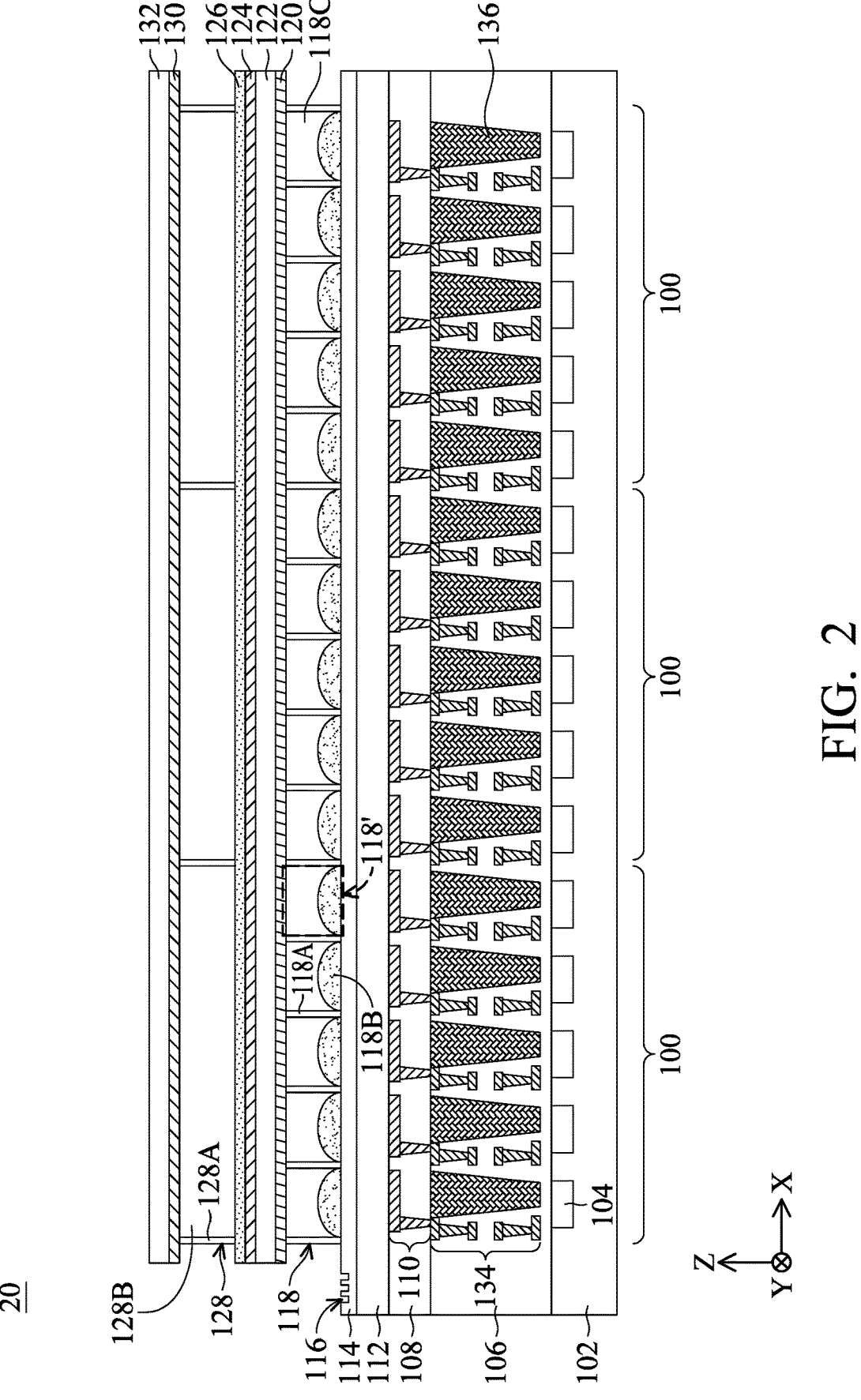
FIG. 2 is a cross-section view of a biosensor in accordance with other embodiments.

FIG. 2 is a cross-section view of a biosensor 20 in accordance with other embodiments. The biosensor 20 in FIG. 2 is similar to the biosensor 10 in EEGs. 1A and 1B, except that the electro-wetting chamber 118 in each sensor unit 100 includes a plurality of electro-wetting cells 118'. The electro-wetting cells 118' are separated from one another by isolation structures 118A. As shown in FIG. 2, in some embodiments, non-polar liquid 118B is disposed in each electro-wetting cell 118'. Similarly, the remaining space in the electro-wetting cell 118' that is not occupied by the non-polar liquid 118B is filled with the aforementioned polar liquid 118C. According to some embodiments, the electro-wetting cells 118' of the electro-wetting chamber 118 are disposed above the first electrodes 110 in one-to-one correspondence. Likewise, the number of the electro-wetting cells 118' included in the electro-wetting chamber 118 is not particularly limited as long as one electro-wetting cell 118' could correspond to one first electrode 110.

Figure 3:
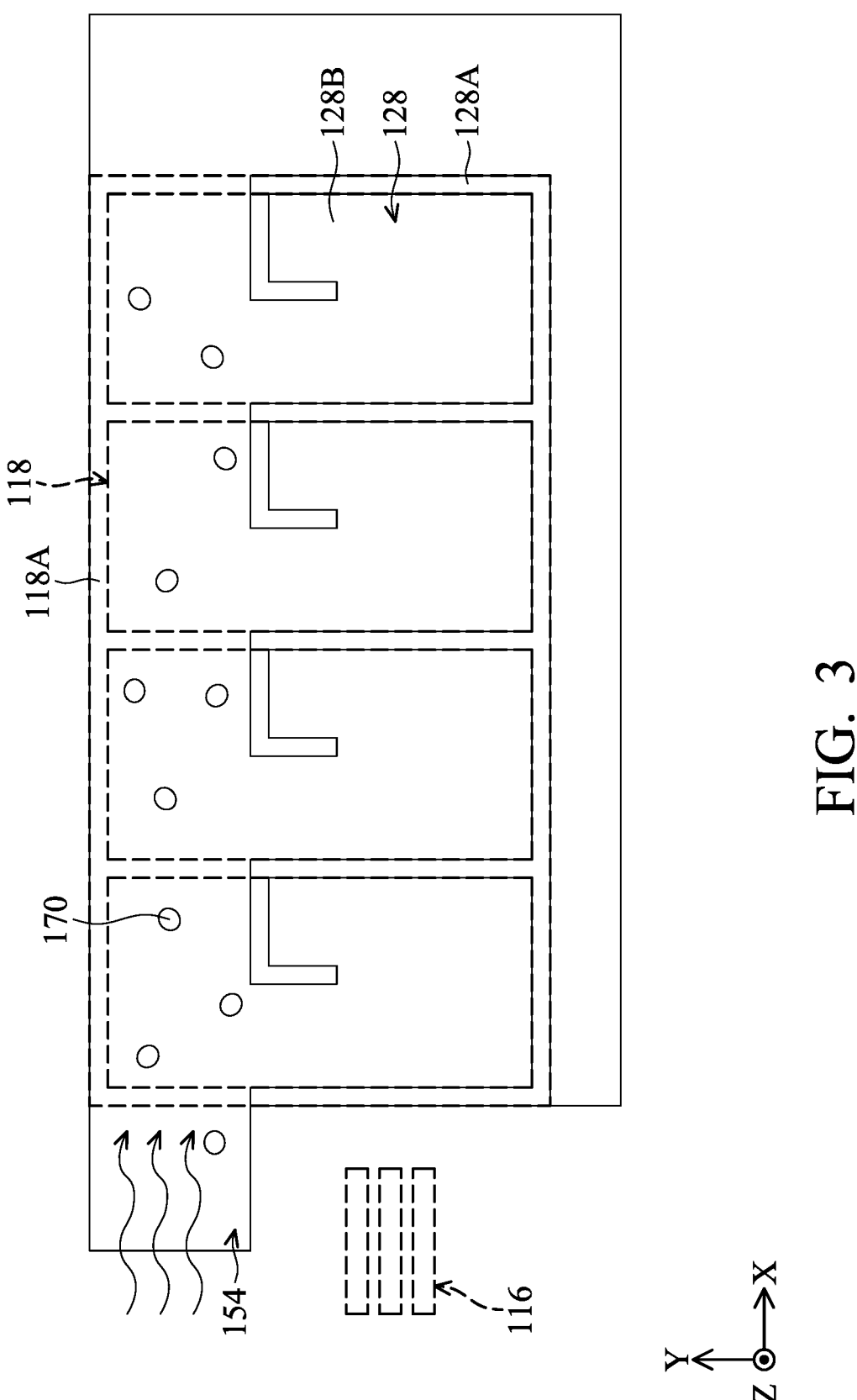
FIGS. 3, 4A-4B, and 5A-5B illustrate cell manipulation using a biosensor in accordance with some embodiments.
Figure 4A:
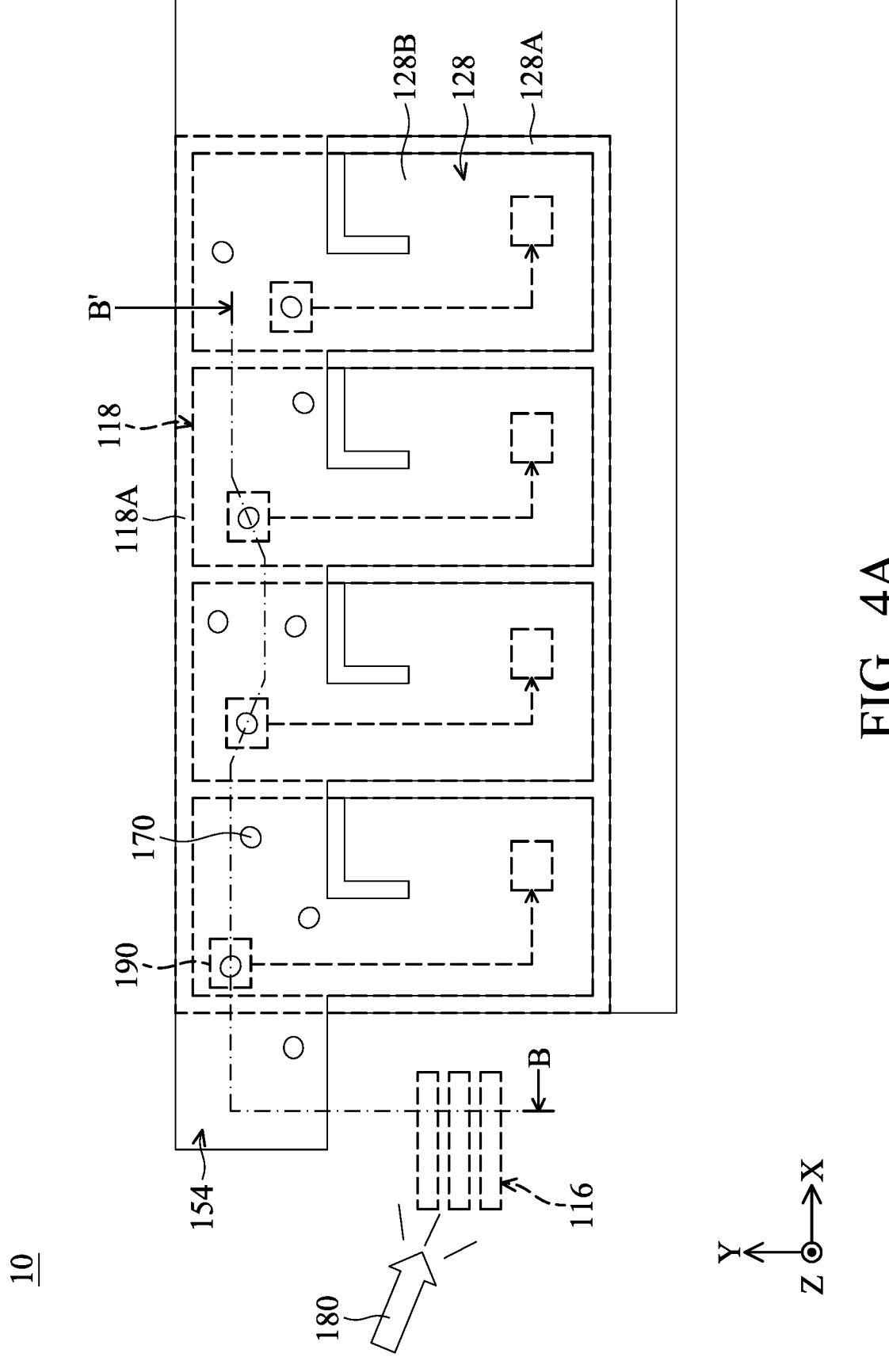
Figure 4B:
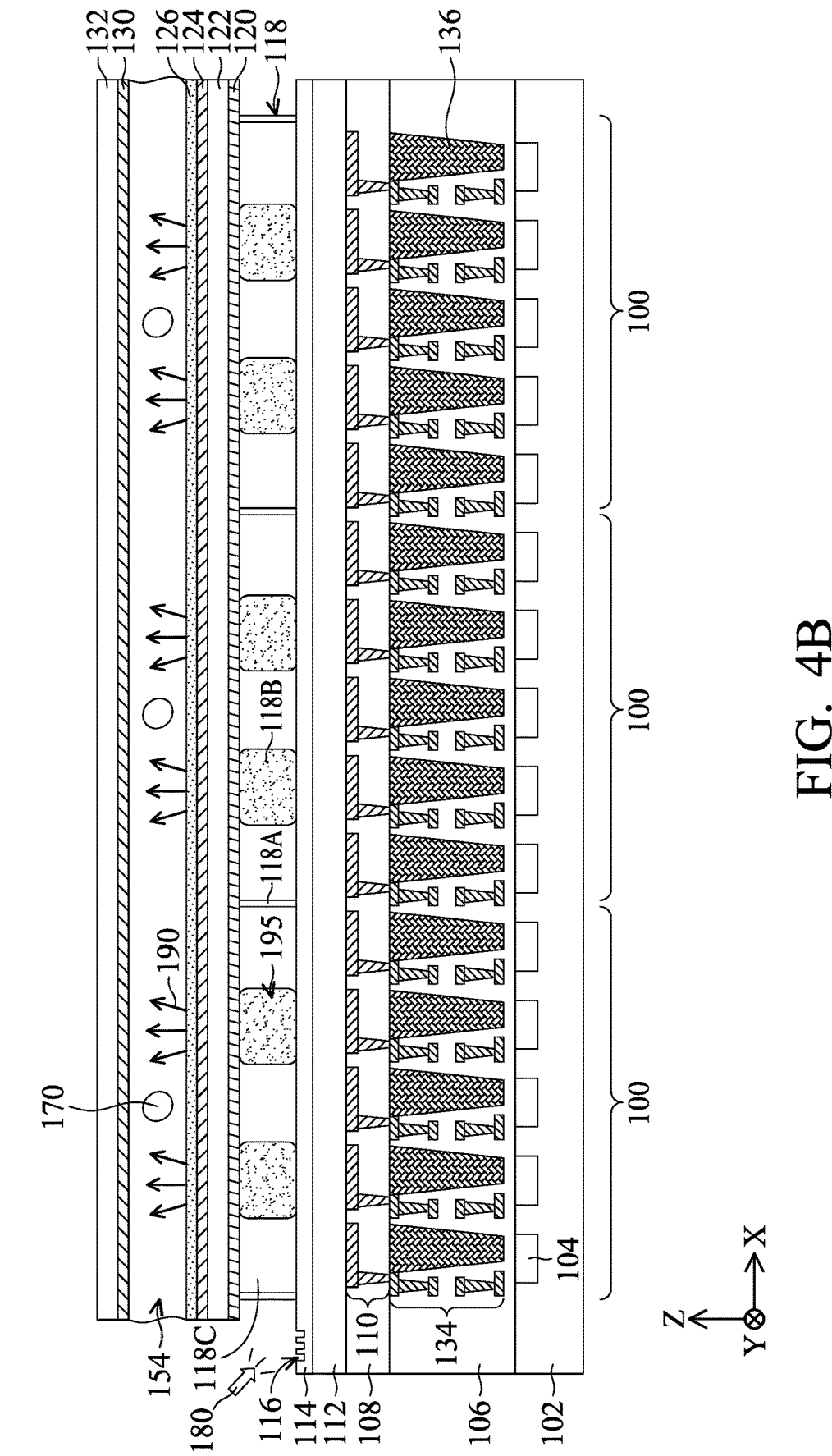
Figure 5A:
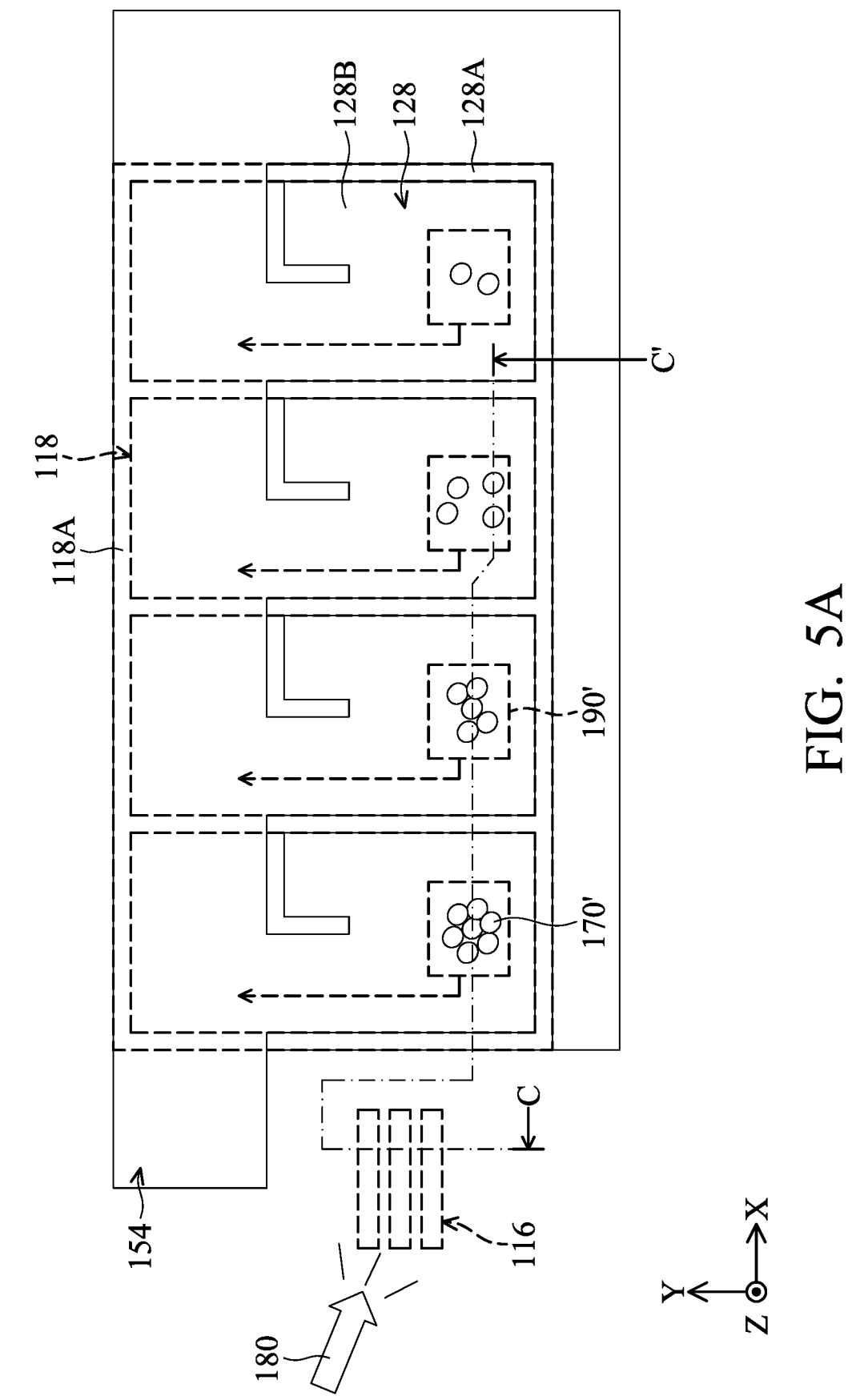
Figure 5B:
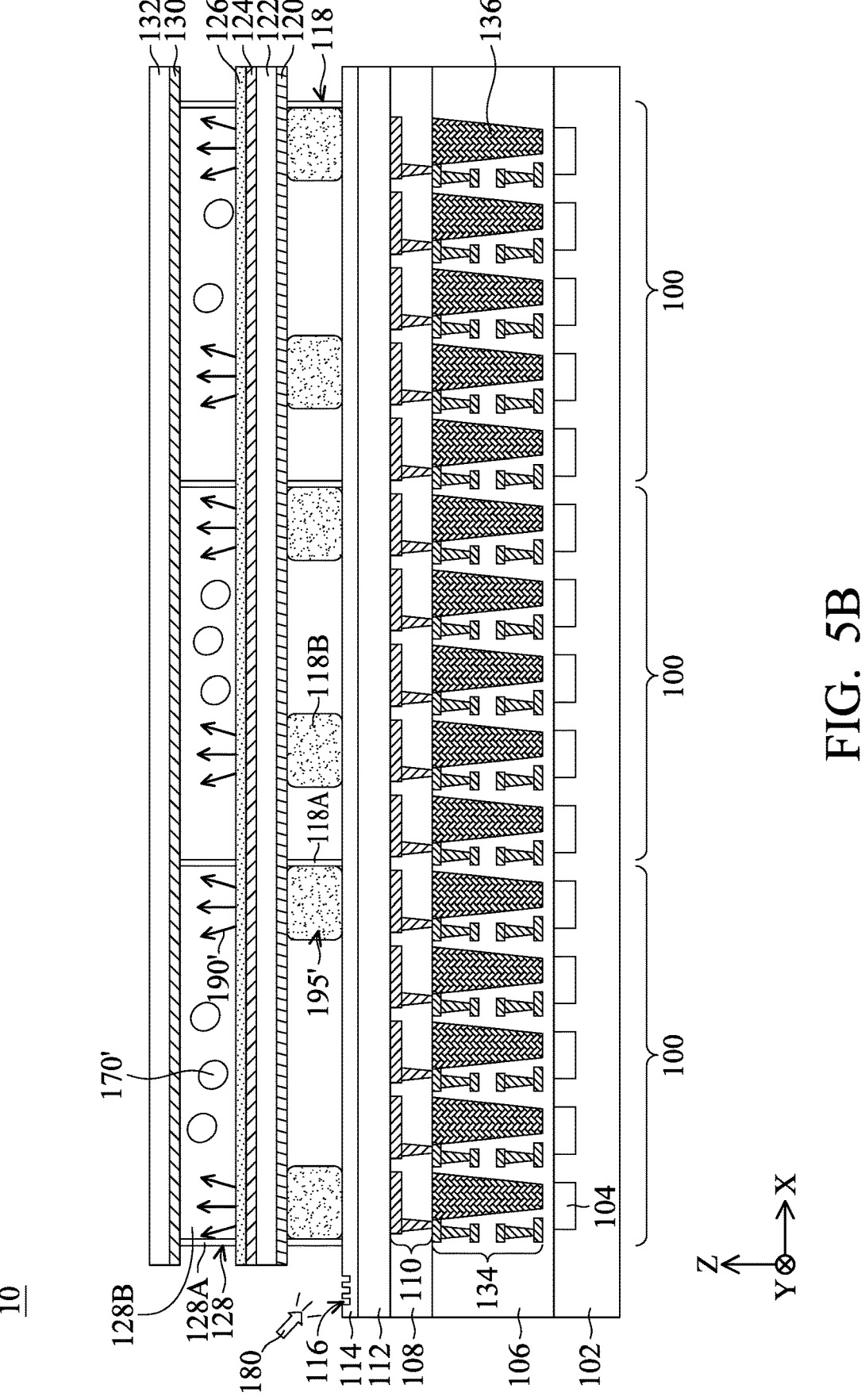

FIGS. 3, 4A-4B, and 5A-5B illustrate cell manipulation using the biosensor 10 shown in FIGS. 1A and 1B in accordance with some embodiments. It should be noted that the cross-sectional views of the biosensor 10 in FIGS. 4B and 5B are taken along lines B-B' and C-C' shown in the top views of FIGS. 4A and 5A, respectively. In addition, for ease of illustration, some of the elements included in the biosensor 10 are omitted in FIGS. 3, 4A, and 5A.

Referring to FIG. 3, the biosensor 10 is provided. The solution containing cells 170 to be manipulated and screened is introduced into the biosensor 10. In particular, the cell manipulation starts at introducing the cells 170 into the microfluidic channel 154 of the biosensor 10 from the inlet (not shown in FIG. 3). After introducing the cells 170, an image may be captured by the photodiodes of the sensor unit 100 under visible light to identify locations of the cells 170 and the isolation structure 128A of the open cell chamber 128 in the biosensor 10.

Next, referring to FIGS. 4A and 4B, a voltage is applied to the bottom conductive layer 124 and the top conductive layer 130. Despite the voltage applied to the bottom conductive layer 124 and the top conductive layer 130, no electric filed is formed between the bottom conductive layer 124 and the top conductive layer 130 because the photoconductive layer 126 is in an insulated state without being irradiated. Subsequently, a voltage is applied to some of the first electrodes 110 and the second electrode 120 to form a first electric field in the electro-wetting chamber 118. After applying voltage to the first electrodes 110 and the second electrode 120, the non-polar liquid 118B in the electro-wetting chamber 118 is deformed with a predetermined shape according to the applied first electric field. Meanwhile, according to some embodiments, the deformed non-polar liquid 118B may be in direct contact with the waveguide layer 114 and the second electrode 120. Accordingly, an optical path 195 can be formed in the non-polar liquid 118B for light propagating through the waveguide layer 114 to pass through.

Next, a laser beam 180 is generated from an external light source (not shown) and is coupled into the waveguide layer 114 through the grating structure 116. The laser beam 180 may propagate though the waveguide layer 114 until it encounters the deformed non-polar liquid 118B. The laser beam 180 may penetrate the optical path 195 formed in the non-polar liquid 118B and reach the microfluidic channel 154 to form a first optical pattern 190 that surrounds a cell 170 to be positioned in the receiving space 128B of the open cell chamber 128. As shown in FIGS. 4A and 4B, the selected cell 170 surrounded by the first optical pattern in the microfluidic channel 154 can be positioned in the receiving space 128B. In particular, by applying a voltage to different first electrodes 110, the first optical pattern 190 may move from the microfluidic channel 154 toward the receiving space 128B. Simultaneously, the cell 170 surrounded by the first optical pattern 190 may move from the microfluidic channel 154 toward the receiving space 128B as well. This way, a single cell 170 may be placed in the open cell chamber 128 each time. After leaving one cell 170 in each open cell chamber 128, the remaining cells 170 keeping still in the microfluidic channel 154 are removed from the biosensor 10 by purging with phosphate buffer saline (PBS) or culture medium suitable for the cell 170 to be incubated in the open cell chamber 128.

Referring to FIGS. 5A and 5B, according to some embodiments, the cell (e.g., the cell 170 in FIGS. 4A and 4B) left in the open cell chamber 128 is incubated for a period of time to generate multiple cells 170' that are derived from the original cell. After generation of multiple cells 170', a voltage is applied to some of the first electrodes 110 and the second electrode 120, enabling an optical path 195' to be formed in the non-polar liquid 118B. The laser beam 180 propagating through the waveguide layer 114 may pass through the optical path 195' in the non-polar liquid 118B, forming a second optical pattern 190' surrounding the cells 170' in the receiving space 128B of the open cell chamber 128. In some embodiments, the first optical pattern 190 formed in the previous steps of cell manipulation has a first projected area on the horizontal plane (e.g., the X-Y plane, shown in FIGS. 4A and 4B). The bottom of the open cell chamber 128 is located at the horizontal plane. The second pattern 190' shown in FIGS. 5A and 5B has a second projected area on the same horizontal plane. The second projected area of the second optical pattern 190' is greater than the first projected area of the first optical pattern 190 so that all the cells 170' after incubation may be surrounded by the second optical pattern 190' and can thus be harvested from the biosensor 10.

Referring again to FIGS. 5A and 5B, the second optical pattern 190' may gradually move from the open cell chamber 128 toward the microfluidic channel 154 by applying a voltage to different first electrodes. Accordingly, the cells 170' surrounded by the moving second optical pattern 190' may be pushed toward the microfluidic channel 154 at the same time. Finally, PBS or culture medium is introduced into the microfluidic channel 154 of the biosensor 10 to direct the cells 170' toward the outlet (not shown) of the biosensor 10 through the microfluidic channel 154 and thus to harvest these cells 170 for further applications.

In accordance with some embodiments, the optical pattern formed by the laser beam passing through the optical path in the non-polar liquid in combination with the electric field generated by applying a voltage to the bottom conductive layer and the top conductive layer gives rise to an electrophoretic force that confines the cell in the optical pattern. By applying the voltage to different first electrodes, the optical pattern may gradually move toward a predetermined direction. As the optical pattern moves, the electrophoretic force shifts and pushes the cell surrounded by the optical pattern toward the predetermined direction. This way, a single cell may be manipulated each time using the biosensor provided by the embodiments of the disclosure.

Figure 6A:
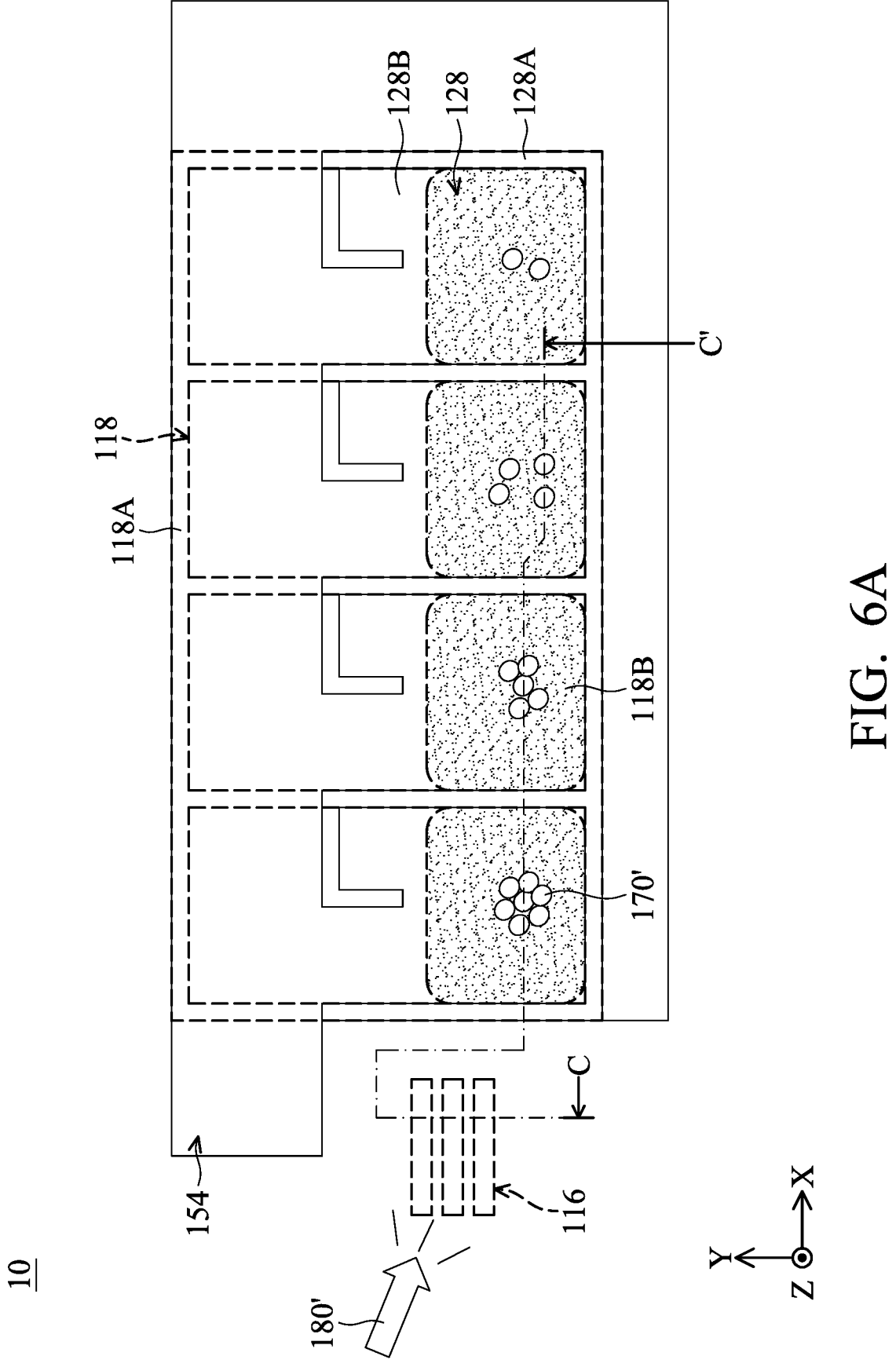
FIGS. 6A-6B and 7A-7B illustrate fluorescence detection using a biosensor in accordance with other embodiments.
Figure 6B:
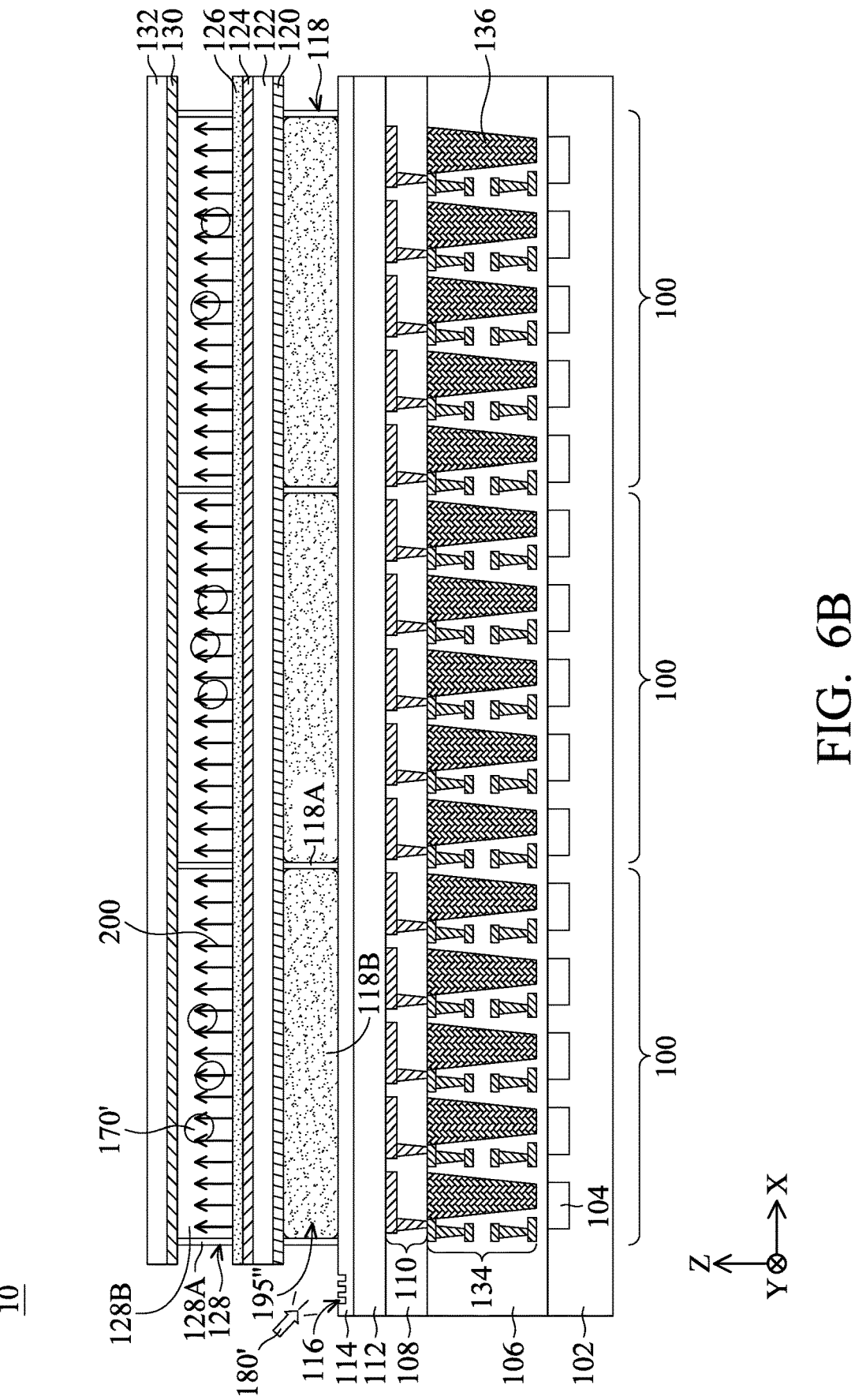
Figure 7A:
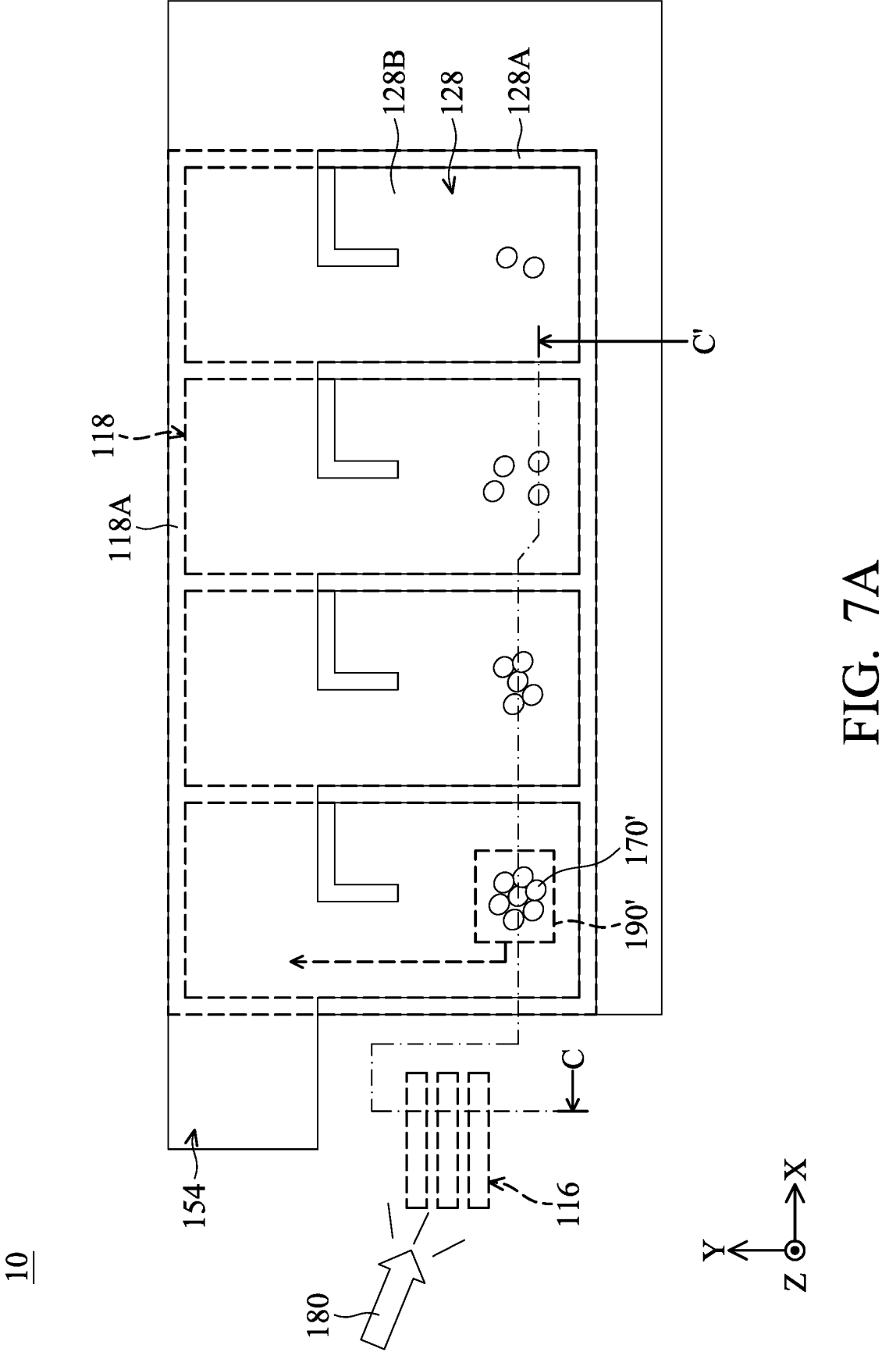
Figure 7B:
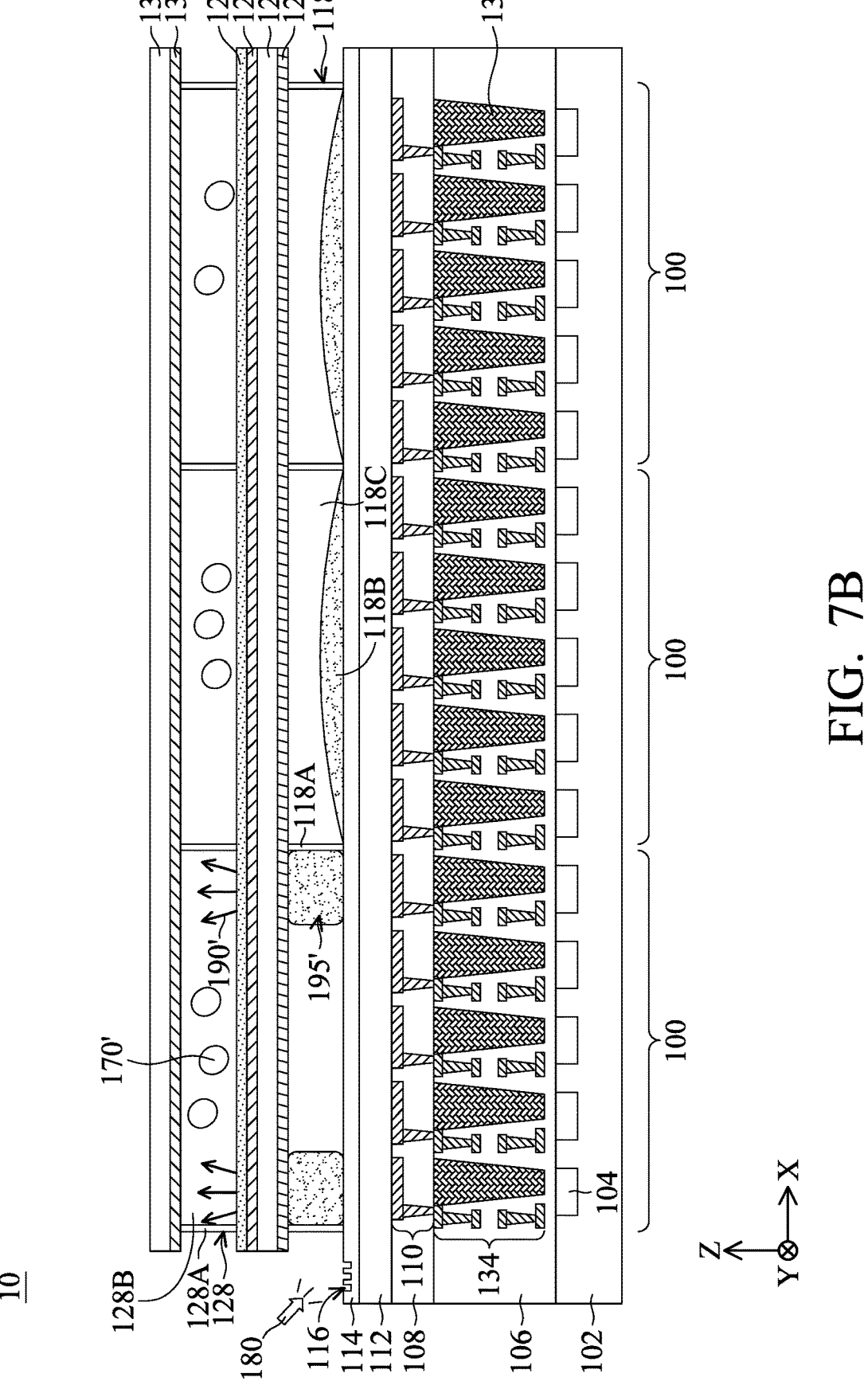

FIGS. 6A-6B and 7A-7B illustrate fluorescence detection using the biosensor 10 shown in FIGS. 1A and 1B in accordance with other embodiments. It should be noted that the cross-sectional views of the biosensor 10 in FIGS. 6B and 7B are taken along the line C-C' shown in the top views of FIGS. 6A and 7A, respectively. In addition, for ease of illustration, some of the elements included in the biosensor 10 are omitted in FIGS. 6A and 7A.

Referring to FIGS. 6A and 6B, in some embodiments, the cell incubation after the cell manipulation step as shown in FIG. 4A is followed by the fluorescent detection step. In particular, the cells 170' may be labeled with a fluorescent tag targeting a specific molecule owned by the cells 170' or having a retaining property on the surface of the cells 170' or inside the cells 170'. For example, in some embodiments, the fluorescent tag may be an antibody conjugated with Alexa 488, a bright, green-fluorescent dye that may have a maximum excitation when using a 488 nm laser beam, to label a specific surface protein expressed on the surface of the cells 170'. If the cells 170' indeed express the surface protein targeted by the antibody, the dye conjugated with the antibody generates emission light when using the 488 nm laser beam, and the cells 170' can be illuminated and be detected by the photodiodes 104 of each sensor unit 100. In other embodiments, the dye used for antibody conjugation and cell labeling may include FITC, SYBR Green, fluorescein, Calcein AM, DyLight 488, and etc.

During the fluorescence detection, a voltage is applied to all the first electrodes 110 underlying the open cell chamber 128 and the second electrode 120. A second electric field is formed in the electro-wetting chamber 118. According to some embodiments, the second electric field area used in the fluorescence detection is larger than the aforementioned electric field area used in the cell manipulation step shown in FIG. 4A. Subsequently, the non-polar liquid 118B is deformed by the second electric field, and thus the non-polar liquid 118B is in direct contact with the waveguide layer 114 and the second electrode 120. Furthermore, as shown in FIG. 6A, in some embodiment, the deformed non-polar liquid 118B may bead directly below the open cell chamber 128. After deformation of the non-polar liquid 118B, a third optical path 195" is formed in the non-polar liquid 118B. Another laser beam 180' that has a different wavelength than the laser beam 180 is used to irradiate the cells 170' having the fluorescent tag. According to some embodiments, the wavelength of laser beam 180' may be shorter than that of laser beam 180, which is used for cell manipulation.

Still referring to FIGS. 6A and 6B, the laser beam 180' may enter and be coupled into the waveguide layer 114 through the grating structure 116 in the waveguide layer 114. Once the propagating laser beam 180' in the waveguide layer 114 encounters the deformed non-polar liquid 118B in the electro-wetting chamber 118, the laser beam 180' enters the third optical path 195" formed in the non-polar liquid 118B and reaches the open cell chamber 128. As such, the cells 170' in the open cell chamber 128 may be irradiated with a light pattern 200 formed by the laser beam 180' and the fluorescent tag of the cells 170' may be excited and generate emission light accordingly. After excitation, a fluorescent signal (i.e., the emission light) generated by the cells 170' may penetrate the underlying layers and may be detected by the photodiodes 104 of each sensor unit 100.

By detecting the fluorescent signals obtained using the aforementioned detection method and determining what open cell chambers the desired cells 170' are located at, cells 170' with a desired property, such as capable of expressing and producing specific bio-molecules, may be identified and be further harvested using the cell manipulation step shown in FIGS. 7A and 7B.

Referring to FIGS. 7A and 7B, the cells 170' identified with the desired property are selected because the desired property (e.g., expressing a specific protein that can be detected using the fluorescent tag and having a better growth rate) is conducive to further applications. To obtain these cells 170' from the open cell chamber 128, a voltage is applied to some of the first electrodes 110 and the second electrode 120 in the sensor unit 100, thereby deforming the non-polar liquid 118B and forming the second optical path 195' in the non-polar liquid 118B. Next, the laser beam 180 is coupled into the waveguide layer 114 through the grating structure 116, and it further passes through the second optical path 195' in the non-polar liquid 118B. Furthermore, the second optical pattern 190' surrounding the cells 170' is formed in the open cell chamber 128 by the laser beam 180 passing through the second optical path 195'. By applying the voltage to different first electrodes 110, the second optical pattern 190' gradually moves from the open cell chamber 128 to the microfluidic channel 154. Simultaneously, the cells 170' surrounded by the second optical pattern 190' are positioned in the microfluidic channel 154 from the receiving space 128B of the open cell chamber 128. Finally, these cells 170' may be harvested by introducing PBS or culture medium into the microfluidic channel 154 and may leave the microfluidic channel 154 via the outlet (not shown) of the biosensor 10.

In summary, according to some embodiments of the disclosure, the sensor unit of the biosensor includes an electro-wetting chamber in which a non-polar liquid is disposed and an open cell chamber above the electro-wetting chamber. The electro-wetting technique combined with the electrophoretic force enables simple and rapid single cell manipulation and fluorescent detection in the same tiny biosensor. Such an elaborate device is conducive to efficient drug development with high throughput, thereby speeding the pace toward production of available medicine for patients suffering from formidable diseases.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A biosensor comprising:
a plurality of sensor units, each sensor unit of the plurality of sensor units comprises:
a plurality of photodiodes;
a plurality of first electrodes disposed above the plurality of photodiodes;
an electro-wetting chamber disposed above the plurality of first electrodes;
a non-polar liquid disposed in the electro-wetting chamber and having a first refractive index;
a second electrode disposed on the electro-wetting chamber;
a bottom conductive layer disposed above the second electrode;
a photoconductive layer disposed on the bottom conductive layer;
an open cell chamber having an open cell chamber bottom disposed on the photoconductive layer and configured to receive a biological cell; and
a top conductive layer disposed on the open cell chamber.

2. The biosensor as claimed in claim 1, wherein the photoconductive layer comprises amorphous silicon.

3. The biosensor as claimed in claim 1, wherein each sensor unit of the plurality of sensor units further comprises a stack of dielectric layers disposed between the plurality of first electrodes and the electro-wetting chamber.

4. The biosensor as claimed in claim 3, wherein the stack of dielectric layers comprises an interference filter.

5. The biosensor as claimed in claim 3, wherein the stack of dielectric layers is in direct contact with each first electrode of the plurality of first electrodes.

6. The biosensor as claimed in claim 1, wherein each sensor unit of the plurality of sensor units further comprises a waveguide layer comprising a waveguide layer top surface and disposed between each first electrode of the plurality of first electrodes and the electro-wetting chamber, and wherein the waveguide layer top surface is exposed to the electro-wetting chamber.

7. The biosensor as claimed in claim 6, wherein the waveguide layer has a second refractive index greater than the first refractive index.

8. The biosensor as claimed in claim 1, wherein each first electrode of the plurality of first electrodes is disposed above a corresponding photodiode of the plurality of photodiodes in one-to-one correspondence.

9. The biosensor as claimed in claim 1, wherein the electro-wetting chamber comprises a plurality of isolation structures and a plurality of electro-wetting cells, wherein each electro-wetting cell of the plurality of electro-wetting cells is separated from one another by a corresponding of the plurality of isolation structures, and each electro-wetting cell of the plurality of electro-wetting cells has non-polar liquid.

10. The biosensor as claimed in claim 9, wherein each electro-wetting cell of the plurality of electro-wetting cells is disposed above a corresponding first electrode of the plurality of first electrodes in one-to-one correspondence.

11. The biosensor as claimed in claim 1, further comprising a polar liquid disposed in the electro-wetting chamber and having a third refractive index lower than the refractive index of the non-polar liquid.

12. The biosensor as claimed in claim 1, wherein the electro-wetting chamber comprises an isolation structure between the second electrode and the plurality of first electrodes and surrounding non-polar liquid.

13. The biosensor as claimed in claim 1, wherein the plurality of first electrodes, the second electrode, the bottom conductive layer, or the top conductive layer is transparent, or a combination thereof is transparent.

14. The biosensor as claimed in claim 1, further comprising a microfluidic channel connecting to the open cell chamber.

15. The biosensor as claimed in claim 1, wherein each sensor unit of the plurality of sensor units further comprises a color filter between the plurality of photodiodes and the plurality of first electrodes, and wherein the color filter is disposed above a corresponding photodiode of the plurality of photodiodes in one-to-one correspondence.

16. A method of manipulating a plurality of biological cells using the biosensor of claim 1, the method comprising:
introducing the plurality of biological cells into the biosensor;
applying a first voltage across the bottom conductive layer and the top conductive layer;
deforming the non-polar liquid in response to a first electric field and creating a first optical path in the non-polar liquid by generating the first electric field in the electro-wetting chamber by applying a second voltage across at least a first electrode of the plurality of first electrodes and the second electrode;
forming a first optical pattern surrounding a first biological cell of the plurality of biological cells using a first laser beam passing through the first optical path; and
manipulating the plurality of biological cells by keeping the first biological cell surrounded by the first optical pattern in the open cell chamber and by removing biological cells of the plurality of biological cells, other than the first biological cell, from the biosensor.

17. The method as claimed in claim 16, further comprising:
generating a second plurality of cells derived from the first cells by incubating the first cell left in the open cell chamber;
forming a second optical pattern surrounding the second plurality of cells derived from the first cell using the first laser beam; and
harvesting the second plurality of cells derived from the first cell and surrounded by the second optical pattern from the open cell chamber.

18. The method as claimed in claim 17, wherein the open cell chamber bottom is located on a horizontal plane, and wherein the first optical pattern has a first projected area and the second optical pattern has a second projected area, respectively, on the horizontal plane on which the open cell chamber bottom is located, and wherein the second projected area is larger than the first projected area.

19. The method as claimed in claim 16, further comprising:

generating a second plurality of cells derived from the first cell by incubating the first cell left in the open cell chamber;

labeling the second plurality of cells with a fluorescent tag;

deforming the non-polar liquid in response to a second electric field and forming a third optical path in the non-polar liquid by forming the second electric field by applying a third voltage across the plurality of first electrodes and the second electrode, wherein the first electric field extends through a first effective region and the second electric field extends through a second effective region overlapping and larger than the first effective region;

exciting the fluorescent tag by irradiating the labelled second plurality of cells with a second laser beam passing through the third optical path; and obtaining a fluorescent signal emitted by the excited fluorescent tag.

20. The method as claimed in claim 19, wherein the first laser beam has a first wavelength, and the second laser beam has a second wavelength shorter than the first wavelength.

* * * * *